US009317091B2

(12) United States Patent
Ueda

(10) Patent No.: US 9,317,091 B2
(45) Date of Patent: Apr. 19, 2016

(54) ELECTRONIC DEVICE, METHOD OF CONTROLLING POWER SUPPLY, AND RECORDING MEDIUM STORING POWER SUPPLY CONTROL PROGRAM

(71) Applicant: Shigeo Ueda, Kanagawa (JP)

(72) Inventor: Shigeo Ueda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/600,510

(22) Filed: Jan. 20, 2015

(65) Prior Publication Data

US 2015/0212560 A1    Jul. 30, 2015

(30) Foreign Application Priority Data

Jan. 29, 2014  (JP) .................................. 2014-013880

(51) Int. Cl.
| | |
|---|---|
| *G06K 15/00* | (2006.01) |
| *G06F 3/12* | (2006.01) |
| *G06F 1/26* | (2006.01) |
| *G06F 1/32* | (2006.01) |
| *H04N 1/00* | (2006.01) |
| *B41J 29/00* | (2006.01) |

(52) U.S. Cl.
CPC ................ *G06F 1/263* (2013.01); *B41J 29/00* (2013.01); *G06F 1/3212* (2013.01); *H04N 1/00896* (2013.01); *H04N 1/00901* (2013.01); *G06K 15/4055* (2013.01); *H04N 2201/0081* (2013.01); *H04N 2201/0082* (2013.01); *H04N 2201/0094* (2013.01)

(58) Field of Classification Search
CPC .......... H04N 1/00885; H04N 1/00896; H04N 1/00893; H04N 1/00901; H04N 1/1013; H04N 1/00236; G06K 15/00; G06K 15/4055; G06K 15/005; G06K 15/18; G06F 1/1632; G06F 1/3215; G06F 1/3284; G06F 3/1297
USPC ............... 358/1.14, 475, 1.15, 442, 468, 474, 358/1.16, 479, 480, 483, 484; 379/100.01; 399/69, 88; 703/20; 713/300, 330, 340
See application file for complete search history.

(56) References Cited

U.S. PATENT DOCUMENTS

| | | | | |
|---|---|---|---|---|
| 7,619,759 | B1 * | 11/2009 | Mishima et al. ............. 358/1.14 |
| 7,624,288 | B2 * | 11/2009 | Kishi et al. ..................... 713/300 |
| 8,078,892 | B2 * | 12/2011 | Satoh ............................ 713/320 |
| 8,456,878 | B2 * | 6/2013 | Min ......................... H02J 3/32 323/222 |
| 8,655,307 | B1 * | 2/2014 | Walker et al. ................. 455/405 |
| 8,874,219 | B2 * | 10/2014 | Trier .................. A61N 1/36125 607/46 |
| 8,912,753 | B2 * | 12/2014 | Pudar .................. B60L 11/1816 320/109 |
| 8,963,486 | B2 * | 2/2015 | Kirby ...................... H02J 7/025 320/101 |
| 2004/0095111 | A1 * | 5/2004 | Kernahan ...................... 323/282 |

(Continued)

FOREIGN PATENT DOCUMENTS

| | | |
|---|---|---|
| JP | 2012-088485 | 5/2012 |
| JP | 2013-048542 | 3/2013 |

*Primary Examiner* — Negussie Worku
(74) *Attorney, Agent, or Firm* — Harness, Dickey & Pierce, P.L.C.

(57) ABSTRACT

An electronic device includes a power generation device that generates electricity, a charging battery that charges electricity, and a power supply device that receives power supply from the outside power source. The electronic device selects at least one of the power generation device, the charging battery, and the power supply device as a power supply source to supply electric power to each unit of the electronic device that is operating, based on an operating state of the electronic device or operation being performed by the electronic device.

18 Claims, 13 Drawing Sheets

(56) References Cited

U.S. PATENT DOCUMENTS

| | | | |
|---|---|---|---|
| 2008/0198425 A1* | 8/2008 | Ozaki et al. | 358/475 |
| 2013/0026837 A1* | 1/2013 | Nozawa | 307/66 |
| 2013/0212418 A1 | 8/2013 | Ueda | |
| 2014/0120961 A1* | 5/2014 | Buck | 455/466 |
| 2014/0211239 A1* | 7/2014 | Onishi | 358/1.14 |
| 2014/0253946 A1* | 9/2014 | Sato | 358/1.14 |

* cited by examiner

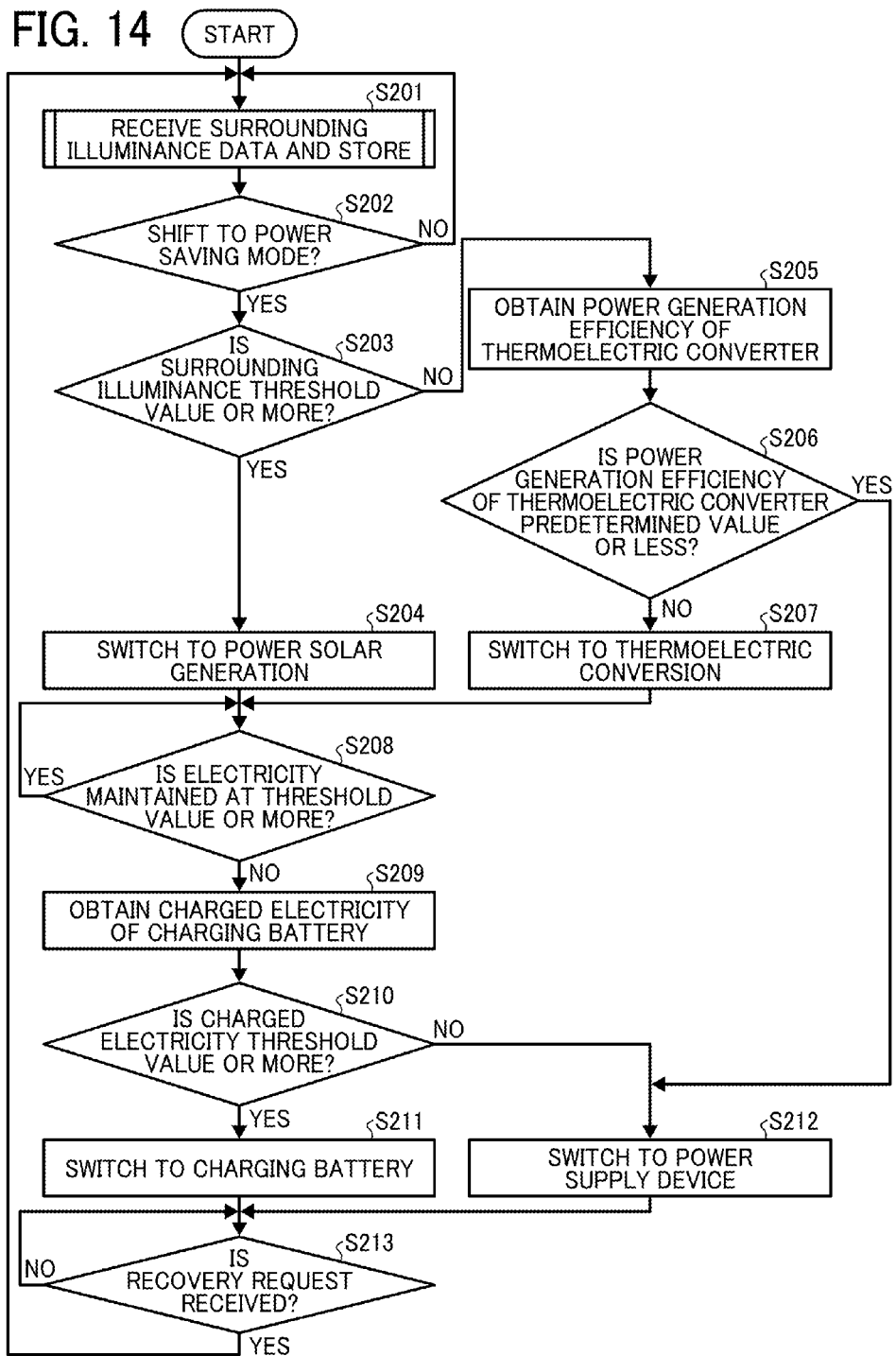

ELECTRONIC DEVICE, METHOD OF CONTROLLING POWER SUPPLY, AND RECORDING MEDIUM STORING POWER SUPPLY CONTROL PROGRAM

CROSS-REFERENCE TO RELATED APPLICATIONS

This patent application is based on and claims priority pursuant to 35 U.S.C. §119(a) to Japanese Patent Application No. 2014-013880, filed on Jan. 29, 2014, in the Japan Patent Office, the entire disclosure of which is hereby incorporated by reference herein.

1. Technical Field

The present invention relates to an electronic device, a method of controlling power supply, and a non-transitory recording medium storing a power supply control program.

2. Description of the Related Art

It is desired for an office device such as a line printer (LP) or a digital multifunction peripheral (MFP) to reduce power consumption not only obviously in operation, but also in waiting-time. Measures have been taken to reduce the power consumption in waiting-time as much as possible. For example, the power supply to a device not in use in waiting-time is turned off or operation is slowed down in a sleep mode or the like.

On the other hand, for making power, supplied by a commercial power source (AC power source) in waiting-time, substantially zero, the technique, trying to make the power consumption of the commercial power source substantially zero, has already been known, in which the power in waiting-time is charged by using a solar battery or a fuel battery, or power generated by power conversion or thermoelectric conversion.

However, since power generation efficiency of a power generation device is low, it is assumed that charge of power generated by the power generation device takes much time. Therefore, when the charge to a charging device is insufficient, there may have been a problem of not capable of using the charged power after a device is shifted to an energy saving mode.

SUMMARY

Example embodiments of the present invention include an electronic device, which includes a power generation device that generates electricity, a charging battery that charges electricity, and a power supply device that receives power supply from the outside power source. The electronic device selects at least one of the power generation device, the charging battery, and the power supply device as a power supply source to supply electric power to each unit of the electronic device that is operating, based on an operating state of the electronic device or operation being performed by the electronic device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 14 is a flowchart illustrating operation of controlling power supply in shifting to the power saving mode of the third embodiment.

Figure 1:
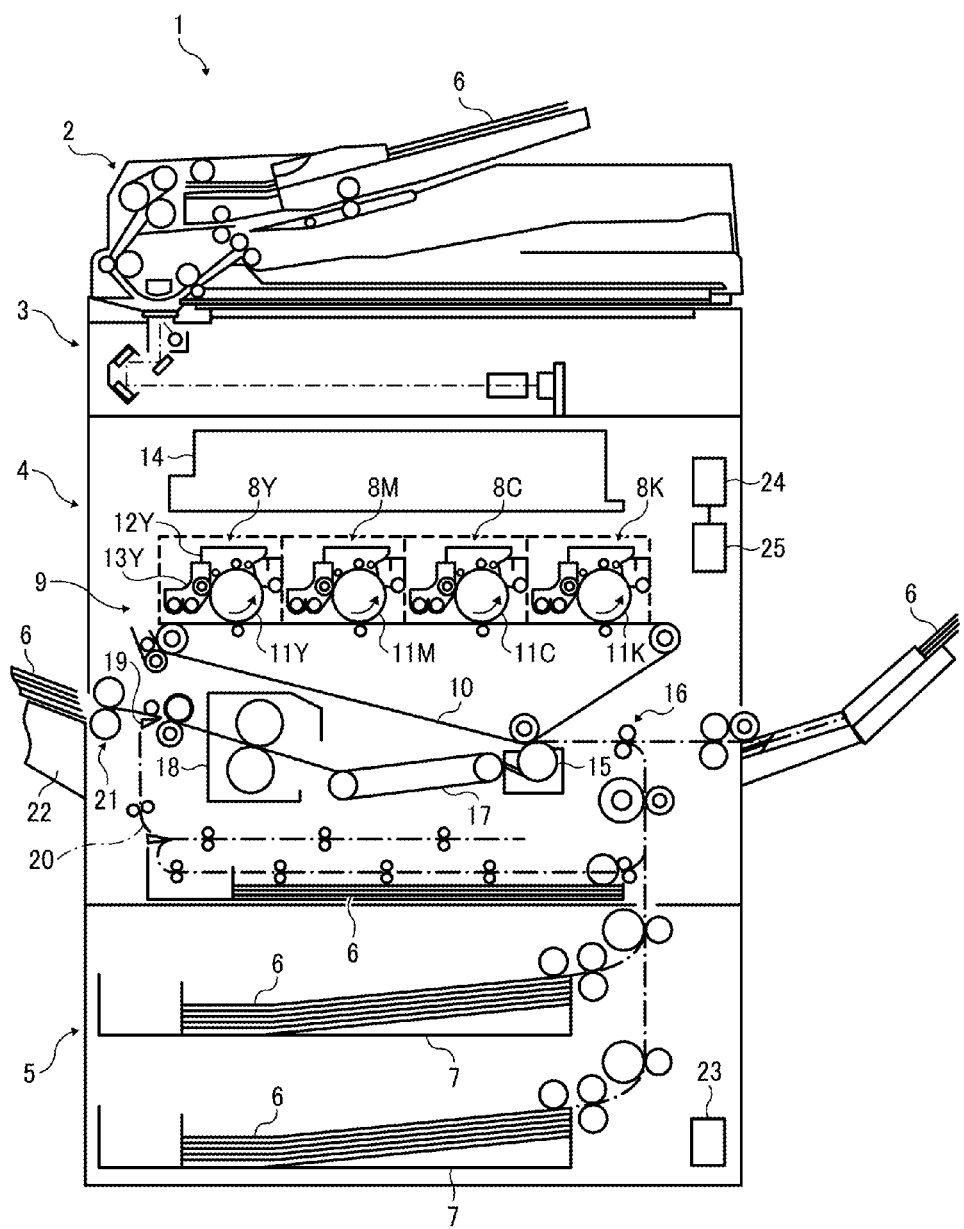
FIG. 1 is a cross-sectional view schematically illustrating a mechanical configuration of an image forming apparatus being a first embodiment of an electronic device of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Hereinafter, embodiments of the present invention will be described in detail with reference to the drawings.

[First Embodiment: FIGS. 1 to 10]

First, an electrophotographic image forming apparatus being a first embodiment of an electronic device of the present invention will be described.

FIG. 1 illustrates a mechanical configuration of the image forming apparatus 1.

As shown in FIG. 1, the image forming apparatus 1 includes an automatic document feeder (ADF) 2, a scanner 3, an image forming unit 4, and a paper feeder 5.

The paper feeder 5 includes paper feeding cassettes 7 which store paper 6 as printing paper on which an image is formed. The image forming unit 4 includes four process cartridges 8Y, 8M, 8C, and 8K, which respectively form toner images of yellow (Y), magenta (M), cyan (C), and black (K).

The image forming unit 4 includes a transfer device 9 substantially at the center in the vertical direction. This transfer device 9 includes an endless intermediate transfer belt 10 as an intermediate transfer body and a plurality of rollers arranged inside a loop of the intermediate transfer belt 10. The intermediate transfer belt 10 is tensioned in an inverted triangular shape by these rollers. At three vertex positions in the inverted triangular shape, each supporting roller is wrapped by the intermediate transfer belt 10 around the periphery of the roller with large winding angle. Then, any one of these three supporting rollers endlessly moves the intermediate transfer belt 10 in the clockwise direction in the figure by its own rotational driving.

At a region where a belt wraps the supporting roller, which is provided on the leftmost side in three supporting rollers in the figure, a belt cleaning device abuts on from outside the loop. This belt cleaning device removes transfer residual toner remained on the surface of the intermediate transfer belt 10, which passes through a secondary transfer nip described below, from the surface of the belt.

A belt region, passing through a contact position with the supporting roller provided on the leftmost side in the figure before entering into a contact position with the supporting roller provided on the rightmost side in the figure, is a horizontal progress region moving straightly along the substantially horizontal direction.

Above this horizontal progress region, four process cartridges 8Y, 8M, 8C, and 8K respectively for Y, M, C, and K are provided in order along the belt moving direction. The process cartridges 8Y, 8M, 8C, and 8K are provided for forming toner images Y, M, C, and K transferred to be superimposed on the intermediate transfer belt 10. This image forming apparatus is so-called a tandem type, in which the toner images Y, M, C, and K are formed respectively by the process cartridges 8Y, 8M, 8C, and 8K.

Although the color order "Y, M, C, K" is employed in this image forming apparatus, the color order is not limited to this order.

In the image forming unit 4, the process cartridges 8Y, 8M, 8C, and 8K respectively include drum-shaped photoreceptors 11Y, 11M, 11C, and 11K as image bearers. A charging device (12Y, or the like), a developing device (13Y, or the like), a photoreceptor cleaning device, a discharging device and the like are provided around the photoreceptor.

An exposure device 14 is provided above the four process cartridges 8Y, 8M, 8C, and 8K. The exposure device 14 and the charging device for Y, M, C, and K form electrostatic latent images on the photoreceptors 11Y, 11M, 11C, and 11K. In the exposure device 14, the uniformly charged surfaces of the photoreceptors 11Y, 11M, 11C, and 11K are optically scanned with writing light for Y, M, C, and K, generated based on image information obtained from image reading by the scanner 3 or image information transmitted from an external personal computer and the like.

The developing devices develop the electrostatic latent images for Y, M, C, and K carried on the surfaces of the photoreceptors 11Y, 11M, 11C, and 11K, into toner images Y, M, C, and K with the toners Y, M, C, and K.

The photoreceptors 11Y, 11M, 11C, and 11K form a primary transfer nip with the intermediate transfer belt 10. Then, on the backside of the primary transfer nip for Y, M, C, and K, primary transfer rollers for Y, M, C, and K arranged inside the loop of the intermediate transfer belt 10 nip the intermediate transfer belt 10 with the photoreceptors 11Y, 11M, 11C, and 11K.

In the primary transfer nip for Y, the toner image Y formed on the photoreceptor 11Y is primarily transferred on the surface of the intermediate transfer belt 10. Then, in this manner, the surface of the belt, on which the toner image Y is primarily transferred, passes through the primary transfer nip for the M, C, and K in order. Then, during that process, the toner images M, C, and K on the photoreceptors 11M, 11C, and 11K are primarily transferred to be superimposed in order. As a result, a color toner image is formed on the surface of the belt.

The transfer residual toner on the surfaces of the photoreceptors 11Y, 11M, 11C, and 11K, which pass through the primary transfer nip for Y, M, C, and K, is cleaned by the photoreceptor cleaning device. Thereafter, the surfaces are destaticized by the discharging device to prepare for the next image forming.

At a region where the belt wraps the supporting roller, which is located in the lowermost position in three supporting rollers provided in the loop of the intermediate transfer belt 10, a secondary transfer roller 15 as a secondary transferring unit abuts on from outside the loop and forms the secondary transfer nip.

A pair of registration rollers 16 is arranged in the right side direction of the secondary transfer nip in the figure, in which the registration rollers 16 include a pair of rollers rotating each other in the forward direction while abutting on each other to form a registration nip. The paper 6 fed from the paper feeder 5 is nipped into the registration nip of the pair of registration rollers 16. Then, the paper 6 is fed toward the secondary transfer nip by the pair of registration rollers 16 at a timing in synchronization with the color toner image on the intermediate transfer belt 10.

The color toner image on the intermediate transfer belt 10 is secondarily transferred to the paper 6 nipped by the secondary transfer nip, by the action of a secondary transfer electric field or nip pressure. In this manner, the paper 6, to which the color toner image is secondarily transferred, is fed into a fixing device 18 after passing through a conveyance belt 17, which moves endlessly, from the secondary transfer nip. The fixing device 18 performs fixing on the toner image for the paper 6, which is nipped by a fixing nip formed by the abutment of a fixing roller and a pressure roller, with heat and pressure.

The paper 6 fed from the fixing device 18 enters into a branch point of a conveyance path on which a conveyance path switching pawl 19 is arranged. This conveyance path switching pawl 19 switches a sheet conveyance path, located on the downstream side of itself, between a delivery path and a reverse conveyance path 20. When a single-sided print mode is selected as a printing operation mode, the conveyance path switching pawl 19 selects the delivery path as the sheet conveyance path.

Also in a case where a double-sided print mode is selected and the paper 6 fed from the secondary transfer nip carries on the toner images on both sides, the conveyance path switching pawl 19 selects the delivery path as the sheet conveyance path. The paper 6 entering into the delivery path is ejected outside a device, after passing through an ejection nip of a pair of paper ejection rollers 21. Then, the paper 6 is stacked on a paper ejection tray 22 fixed to an outside surface of a housing.

Furthermore, the image forming apparatus 1 includes a power supply device 23, which converts an AC power source as a commercial power source into a DC power source and supplies the DC power source to each unit of the image forming apparatus. The image forming apparatus 1 also includes a power generation device 24 and a charging battery 25 described below.

Next, a hardware configuration of devices related to control of power generation and power supply of the image forming apparatus 1 will be described, referring to FIG. 2.

Figure 2:
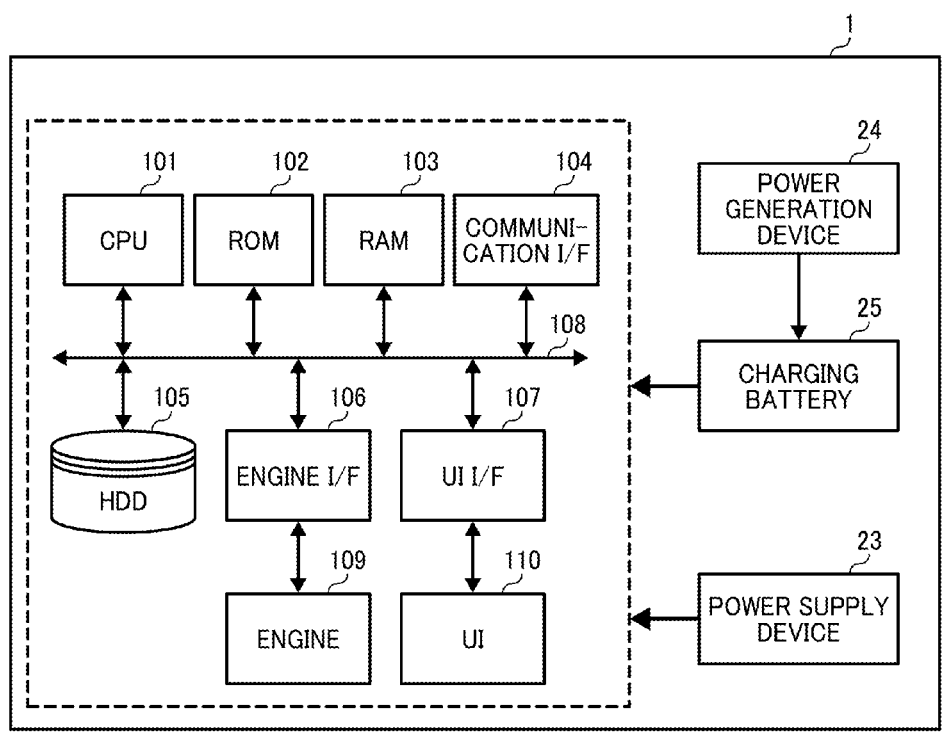
FIG. 2 is a block diagram illustrating a hardware configuration of a part of the image forming apparatus of FIG. 1 relating to control of power generation and power supply according to an embodiment of the present invention.

As illustrated in FIG. 2, the image forming apparatus 1 includes a controller, in which a CPU 101, a ROM 102, a RAM 103, a communication interface (I/F) 104, an HDD 105, an engine I/F 106, and a user interface (UI) I/F 107 are connected through a system bus 108. In addition, an engine 109 is connected to the engine I/F 106 and a UI 110 is connected to the UI I/F 107.

The CPU 101 loads a program stored in the ROM 102 or HDD 105, onto the RAM 103 that functions as a work area for the CPU 101. With the control program, the CPU 101 controls operation of the entire image forming apparatus to achieve various functions described below. The communication I/F 104 is an interface for communicating with an external device such as a host PC described below via a network such as a LAN. The CPU 101 controls the communication I/F 104 using a control program, to perform communication.

The HDD 105 stores various data including an application program.

The engine 109 may be a printer engine (corresponding to the image forming unit 4 in FIG. 1) and a scanner engine (corresponding to the scanner 3 in FIG. 1), which perform output processing (printing, image reading, or the like). The engine I/F 106 is an interface which connects the engine 109 with the CPU 101 to allow the CPU 101 to control the engine 109.

The UI I/F 107 is an interface which connects the UI 110 with the CPU 101 to allow the CPU 101 to control the UI 110.

The UI 110 receives a user instruction or outputs information to the user. The user instruction may be received in the form of data indicating specific operation or specific contents from the external device such as the host PC described below. The information may be transmitted to the user, in the form of data indicating contents to be displayed on a display such as a monitor The image forming apparatus 1 further includes the power generation device 24 and the charging battery 25, in addition to the above-described power supply device 23. The power generation device 24 includes a plurality of power generation modules that perform solar power generation, thermoelectric conversion power generation, power regenerating generation, respectively. The charging battery 25 charges power generated by the power generation device 24.

Figure 3:
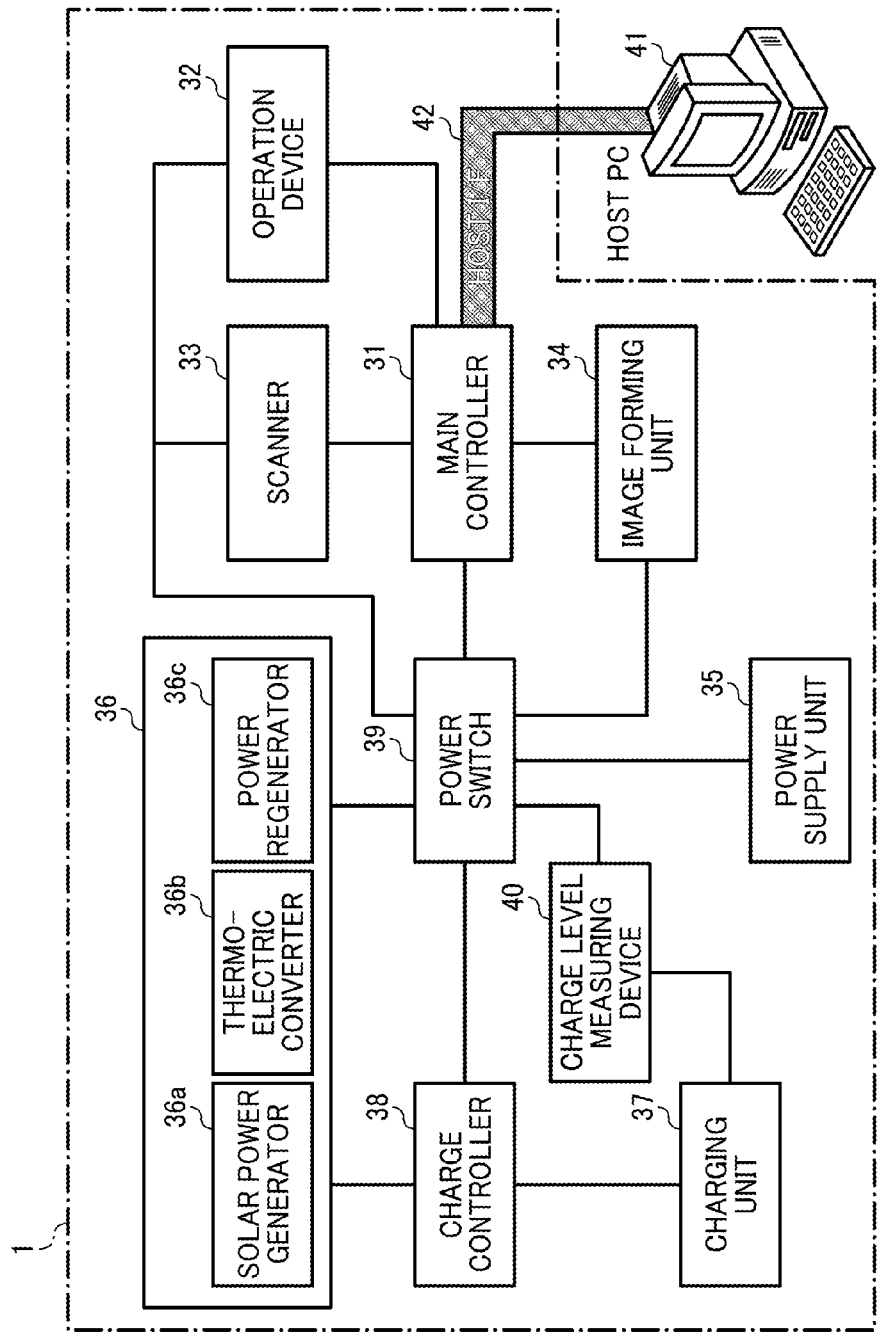
FIG. 3 is a schematic block diagram illustrating a configuration of the image forming apparatus of FIG. 1 according to an embodiment of the present invention.

FIG. 3 is a block diagram illustrating the configuration of the image forming apparatus 1. FIG. 3 mainly illustrates the functional structure relating to the control of power generation and power supply, which may be implemented by hardware or a combination of hardware and software.

As illustrated in FIG. 3, the image forming apparatus 1 includes a main controller 31, an operation device 32, a scanner 33, an image forming unit 34, a power supply unit 35, a power generator 36, a charging unit 37, a charge controller 38, a power switch 39, and a charge level measuring device 40. The image forming apparatus 1 is connected to an external host PC 41 via a host I/F 42, and can control each of the illustrated devices of the image forming apparatus 1 by a command from the host PC 41.

The main controller 31 controls entire image forming apparatus 1. The CPU 101 executes a control program stored in the ROM 102 or HDD 105, to function as the main controller 31.

The operation device 32 receives a user instruction from the user or presents information to the user. The operation device 32 is implemented by the UI 110 under control of the CPU 101.

The scanner 33, which corresponds to the engine 109 such as the scanner engine, reads an image of an original. The image forming unit 34, which corresponds to the engine 109 such as the printer engine, forms an image on a recording medium such as paper. The CPU 101 controls the engine 109 according to an image forming control program, so as to implement the scanner 33 and the image forming unit 34.

The power supply unit 35 converts the AC power source, which is one example of a commercial power source, into the DC power source and supplies the DC power source to each device of the image forming apparatus that is operating. The power supply unit 35 is achieved by the power supply device 23.

The power generator 36 includes a solar power generator 36a, a thermoelectric converter 36b, and a power regenerator 36c, each of which is implemented by a power generation module that generates power using a specific power generation method According to the condition of the image forming apparatus 1 and/or the surrounding environment, at least one of the plurality of power generation modules is selected as described below.

The solar power generator 36a may be implemented by a solar battery that generates power by using sunlight or light of an electric lamp.

The thermoelectric converter 36b generates power by the difference of temperature between high temperature and low temperature, using heat generated by a device that generates heat such as the fixing device and a thermoelectric element that is provided near the fixing device 18 of the image forming unit 4 (FIG. 1).

The power regenerator 36c converts kinetic energy, for example, caused by rotational motion of a motor and the like of a device in the apparatus such as in the image forming unit 4, into electric energy.

The charging unit 37 temporarily charges power generated by the power generator 36, and may be achieved by the charging battery 25.

The charge controller 38 controls electric charge supplied from the power generator 36 to the charging unit 37 and further controls electric discharge from the charging unit 37, to transmit discharged power to the power switch 39 described below. The CPU 101 executes a control program stored in the ROM 102 or the HDD 105 to operate as the charge controller 38. More specifically, the charge controller 38 cooperates with the charging unit 37 to achieve charging function for the image forming apparatus 1.

The power switch 39 selects one of the power generator 36, the charging unit 37, and the power supply unit 35 as a selected power supply source to supply power to each unit of the image forming apparatus 1 that is operating. The selection is made based on the operating state (operating condition) and/or operation contents of the image forming apparatus 1.

In this example, the operating state is represented by an operation mode of the image forming apparatus 1 such as a normal operation mode and a plurality of power saving modes (first to third example power saving modes described below). The operation contents is represented by specific operation performed by the image forming apparatus 1, such as image forming operation, image reading operation, communicating operation and the like.

The main controller 31 transmits information indicating the operation mode (normal operation mode/power saving mode) of the image forming apparatus 1 to the power switch 39, which then becomes a trigger of power switching control by the power switch 39.

The charge level measuring device 40 operates as a charged electricity measuring unit that measures electricity charged in the charging unit 37.

The host I/F 42 connects the main controller 31 with the host PC 41, which may be implemented by the communication I/F 104.

Although in the example of FIG. 3, the power generator 36 (power generation device 24), the charging unit 37 (charging battery 25), and the charge controller 38 (CPU 101) are arranged inside the image forming apparatus 1, any one of these devices or functional modules may be provided outside the image forming apparatus 1. In this manner, even when any of the power generator 36, the charging unit 37, and the charge controller 38 does not operate due to failure, only an external functional module that corresponds to any one of these devices needs to be replaced. Compared with replacing or repairing the image forming apparatus body, maintenance of these devices or functional modules can be easily made.

Figure 4:
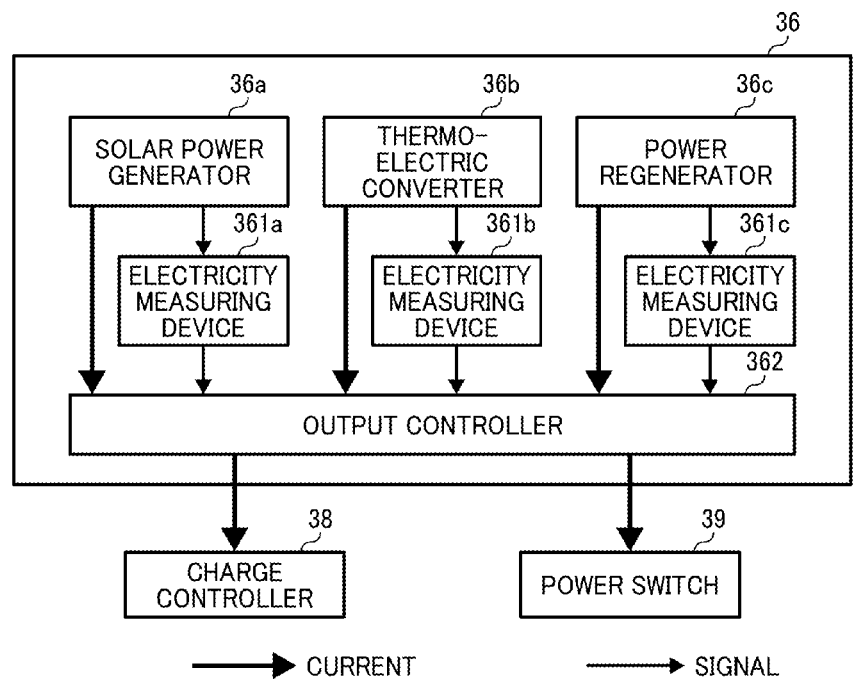
FIG. 4 is a diagram for explaining a configuration of a power generator 36 according to an embodiment of the present invention.

Next, a more detailed configuration of the functional block of the power generator 36 will be described. FIG. 4 is a diagram for explaining the configuration of the power generator 36.

In FIG. 4, the power generator 36 includes the solar power generator 36a, the thermoelectric converter 36b, the power regenerator 36c, and electricity measuring devices (361a, 361b, and 361c) for measuring electricity of the corresponding power generation module. The power generator 36 also includes an output controller 362.

The functions of the solar power generator 36a, the thermoelectric converter 36b, and the power regenerator 36c have already been described, and therefore, the description thereof will be omitted.

The electricity measuring devices 361a to 361c each measure electricity per unit time (hereinafter referred to as "power generation efficiency") in each of the solar power generator 36a, the thermoelectric converter 36b, and the power regenerator 36c. The unit time may be, for example, one minute.

The electricity measuring devices (361a to 361c), for example, include a computing unit including a CPU, a ROM, and a RAM, a timer, and a current measuring module, to obtain power generation efficiency by measuring a power generation current per unit time. The current measuring module is a device for measuring a value of current which flows through a certain load (resistance, or the like).

The output controller 362 selects the power generation module, which supplies power to each unit of the image forming apparatus that is operating, among the solar power generator 36a, the thermoelectric converter 36b, and the power regenerator 36c, based on the power generation efficiency from the electricity measuring devices (361a to 361c). That is, the output controller 362 selects the power generation module with the highest power generation efficiency at that time, and transmits the power generated by the selected power generation module to the charge controller 38 or the power switch 39. The function of the output controller 362 may be realized by the CPU (software) or a simple logic circuit (hardware).

The power, generated by the selected power generation module of the power generator 36, is transmitted to the charge controller 38 or the power switch 39 by the output controller 362. The output controller 362 determines a specific device to which the power is transmitted, based on the operation mode (normal operation mode or power saving mode) of the image forming apparatus 1, and switches to the charge controller 38 or the power switch 39. That is, in the normal operation mode, the power generated by the power generation module is transmitted to the charging unit 37 through the charge controller 38, and charged in the charging battery 25. In the power saving mode, the power is supplied to each unit of the image forming apparatus 1 through the power switch 39. In FIG. 4, a thick arrow shows current and a thin arrow shows signals (hereinafter, the same in FIGS. 5, 7 to 9, 11, and 13).

Figure 5:
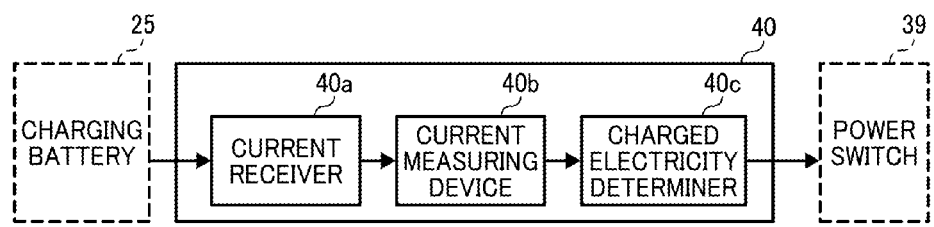
FIG. 5 is a block diagram illustrating a configuration of a charge level measuring device according to an embodiment of the present invention.

Next, the charge level measuring device 40 will be described. FIG. 5 is a block diagram illustrating a configuration of the charge level measuring device 40.

In FIG. 5, the charge level measuring device 40 includes a current receiver 40a, a current measuring device 40b, and a charged electricity determiner 40c.

The current receiver 40a receives current flowing to the charging battery 25. Specifically, the load (resistance) is connected to the charging battery 25, and the current receiver 40a receives the current flowing therein. The reception of the current is performed regularly (for example, every one minute).

The current measuring device 40b measures the current value of the current received by the current receiver 40a.

The charged electricity determiner 40c calculates a voltage value, capable of being supplied by the charging battery, from the current value measured by the current measuring device 40b. The determiner 40c further determines capacity charged in the charging battery. These data regarding the voltage and capacity are transmitted to the power switch 39.

The power switch 39 determines whether, from which of the charging unit 37 or the power supply unit 35, the power is to be supplied to each unit of the image forming apparatus 1 that is operating, based on the data from the charged electricity determiner 40c, and switches to the charging unit 37 or the power supply unit 35.

Next, a configuration of the power switch 39 will be described, referring to FIG. 6.

Figure 6:
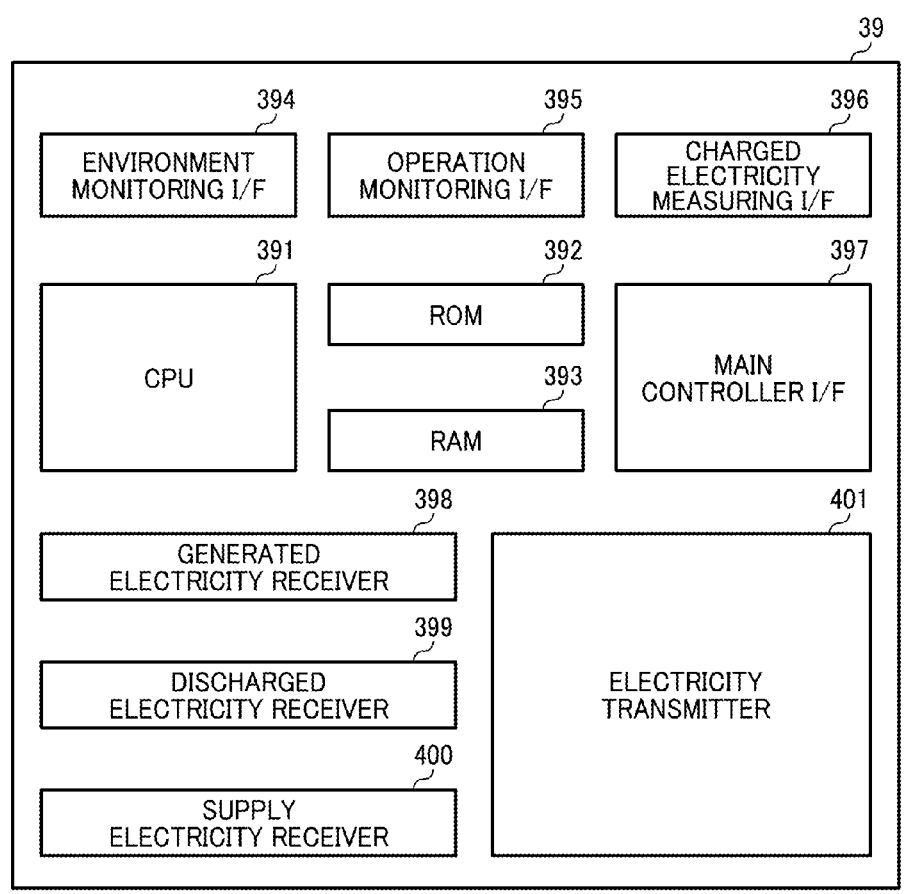
FIG. 6 is a block diagram illustrating a configuration of a power switch according to an embodiment of the present invention.

In FIG. 6, the power switch 39 includes a CPU 391, a ROM 392, and a RAM 393. The CPU 391 controls entire operation to be performed by the power switch 39 according to a control program stored in the ROM 392. The RAM 393 functions as a work memory for the CPU 391.

In addition, the power switch 39 includes an environment monitoring I/F 394, an operation monitoring I/F 395, a charged electricity measuring I/F 396, a main controller IF 397, a generated electricity receiver 398, a discharged electricity receiver 399, a supply electricity receiver 400, and an electricity transmitter 401.

Figure 13:
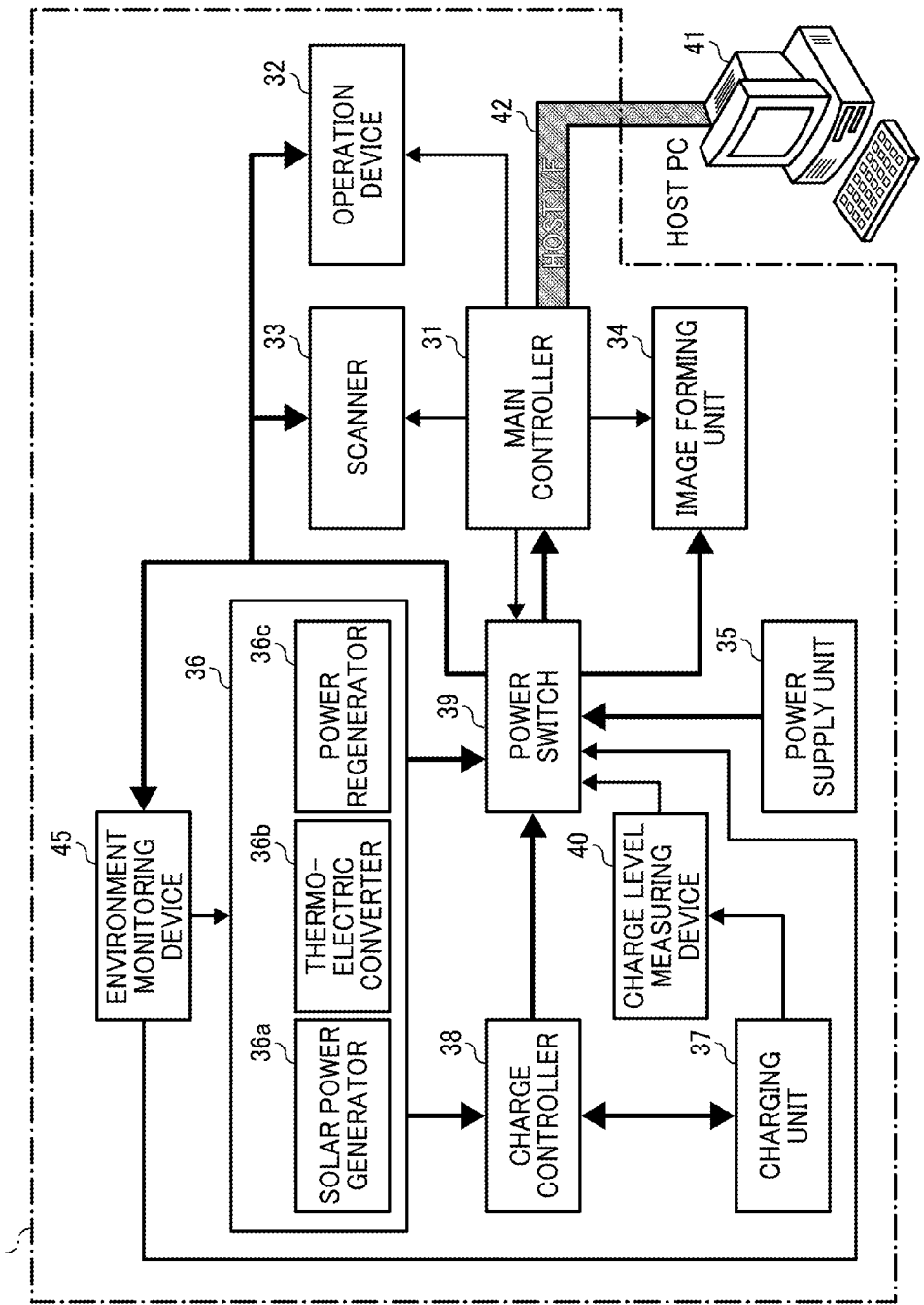
FIG. 13 is a functional block diagram, corresponding to FIG. 3, of the image forming apparatus being a third embodiment of the electronic device of the present invention.

The environment monitoring I/F 394 is an interface for receiving illuminance data from an illuminance sensor (one embodiment of a light quantity measuring unit) included in an environment monitoring device 45 described below (FIG. 13).

Figure 11:
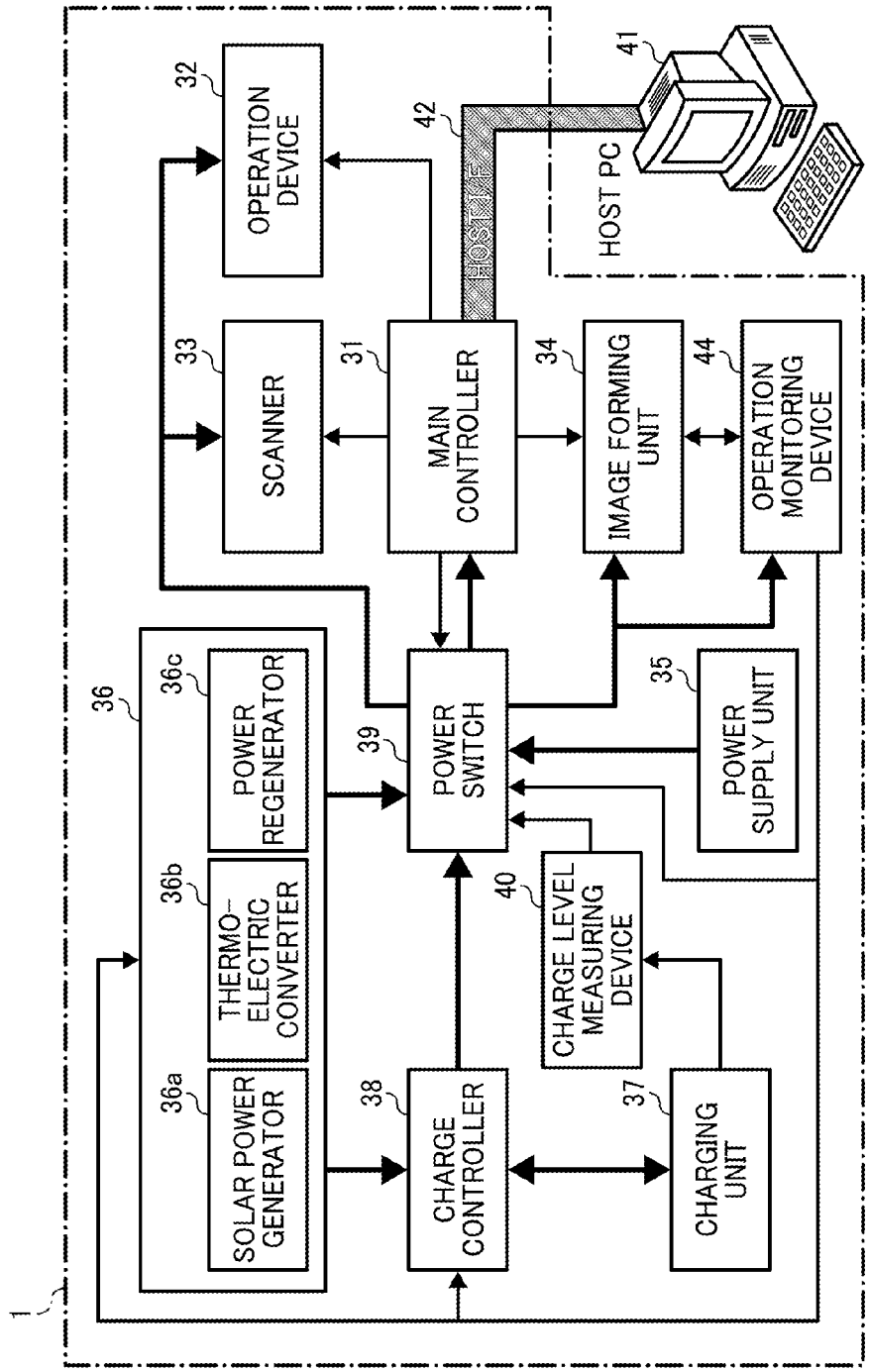
FIG. 11 is a functional block diagram, corresponding to FIG. 3, of the image forming apparatus being a second embodiment of the electronic device of the present invention.

The operation monitoring I/F 395 is an interface for receiving operating state data of the image forming unit 34 from an operation monitoring device 44 described below (FIG. 11).

The charged electricity measuring I/F 396 is an interface for receiving data transmitted by the charge level measuring device 40 which measures charged electricity of the charging battery.

The main controller I/F 397 is an interface for communicating with the main controller 31.

Among these I/Fs, the environment monitoring I/F 394 and the operation monitoring IF 395 may not be provided, since they are not used in this embodiment. For simplicity, the environment monitoring I/F 394 and the operation monitoring I/F 395 have been described here, so that the explanation thereof is in common with the embodiments described below.

The generated electricity receiver 398 directly receives the power generated by the power generation module mounted on the power generation device 24 (power generator 36).

The discharged electricity receiver 399 receives the power when the power charged in the charging battery 25 (charging unit 37) is discharged.

The supply electricity receiver 400 receives the power supplied by the power supply device 23 (power supply unit 35).

The electricity transmitter 401 transmits the power received from the above-described power supply unit 35, the power generator 36, or the charging unit 37 to the main controller 31.

The CPU 391 of the power switch 39 determines a power supply source from which power is to be transmitted, based on the data received from the environment monitoring device 45, the operation monitoring device 44, and the charge level measuring device 40, and switches the power supply source.

Next, example operation of controlling power supply when the image forming apparatus 1 is shifted to the power saving mode, will be described.

In this example, the image forming apparatus 1 may operate in one of three types of power saving modes described below with reference to FIGS. 7 to 9. The time to transition to the power saving mode may be arbitrarily set, for example, when user input or processing such as scanning or printing is not performed for a predetermined time. The power saving mode differs in the degree to which the power is supplied to the main controller 31. The power saving mode to be shifted can be selected in an arbitrary manner. For example, the power saving mode to be shifted may be previously selected or set according to user preference, or may be automatically selected by the main controller 31 based on the operating state of the main controller 31.

Figure 7:
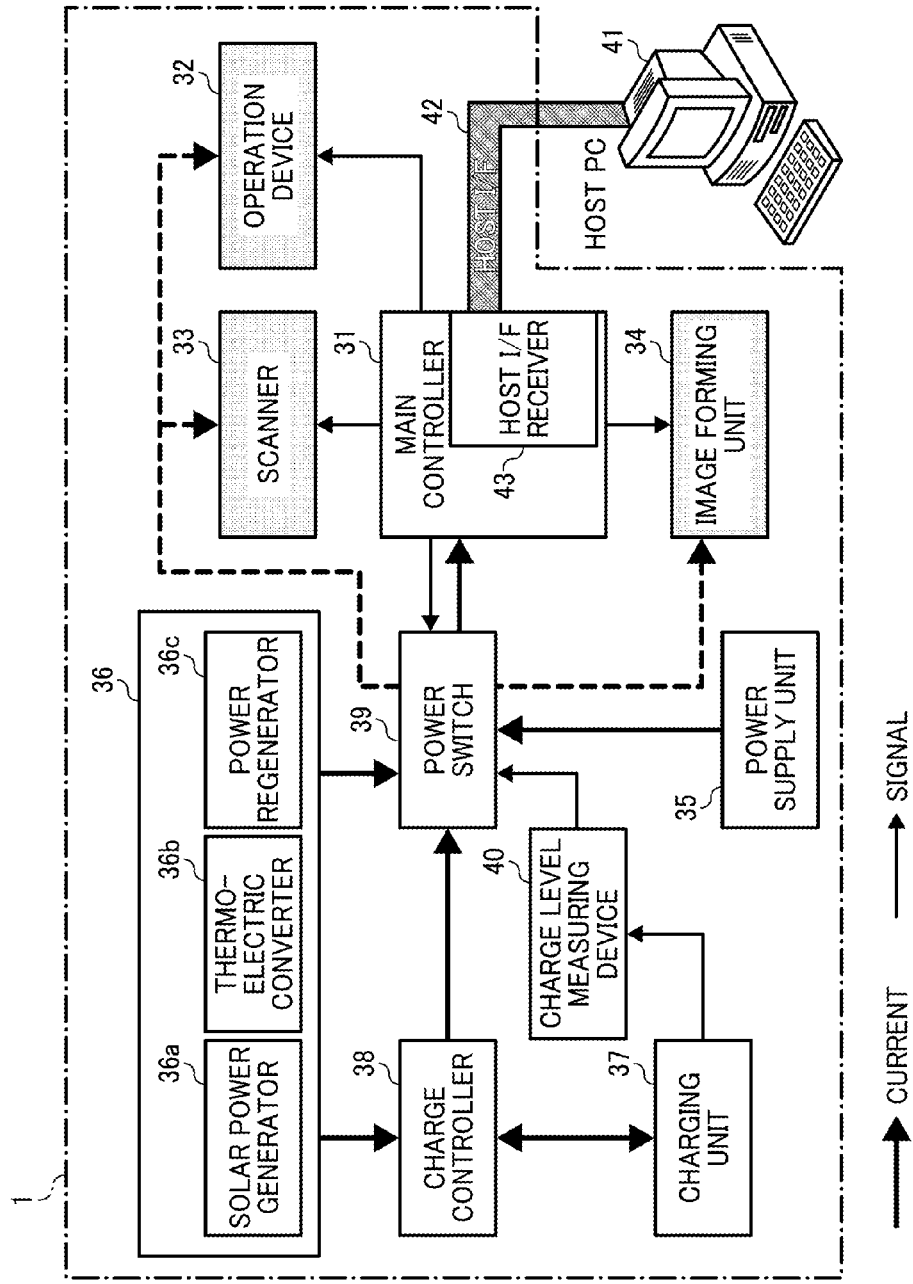
FIG. 7 is a diagram for explaining power supply in a power saving mode according to an embodiment of the present invention.

FIG. 7 is a diagram for explaining the power supply of the first example in the power saving mode. FIG. 7 corresponds to FIG. 3, and the same reference numerals are given to the same functional blocks.

This first example is an example in which the power is supplied to the main controller 31 including a host I/F receiver 43, while the power supply to the operation device 32, the scanner 33, and the image forming unit 34 is turned off. The power is supplied to various sensors ("sensor") that detect a user input, which is a trigger to restore from the power saving mode, such as a touch panel, a human sensor, or a pressure plate opening/closing sensor.

In the figure, a broken line shows a power supply path in which the power supply has been turned off. In addition, gray hatching shows portions in which the power is not supplied (the same in the following FIGS. 8 and 9).

Figure 10:
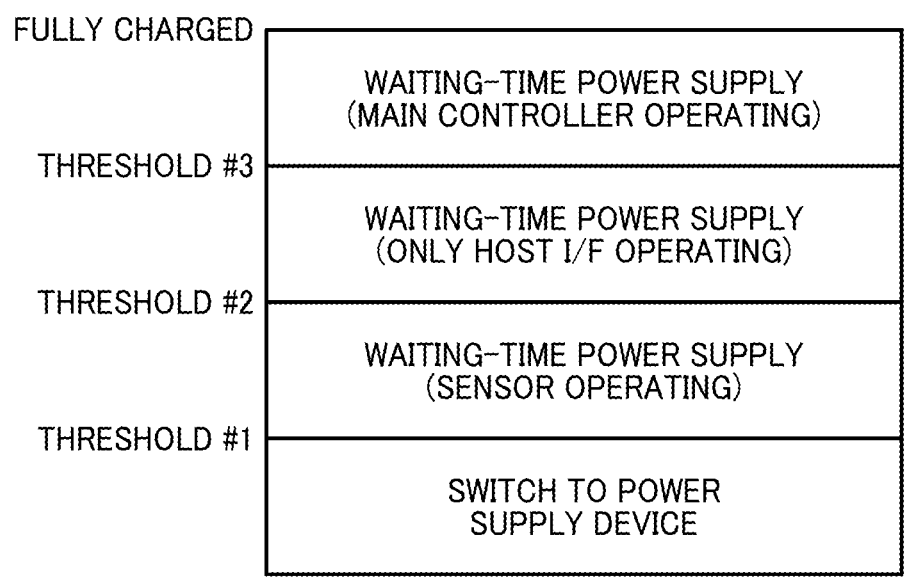
FIG. 10 is a diagram for explaining a threshold value used for determining charged electricity performed by a charged electricity determiner of the charge level measuring device according to an embodiment of the present invention.

In this state, the power switch 39 controls the charging unit 37 to supply power from the charging unit 37 to the main controller 31 and the sensor, when the charged electricity of the charging unit 37 (charging battery 25) is equal to or greater than a threshold value #3 (see FIG. 10). When the charged electricity of the charging unit 37 is less than the threshold value #3, the power switch 39 controls the power supply unit 35 to supply power from the power supply unit 35 (power supply device 23) to the main controller 31 and the sensor.

The switching of the power supply by the power switch 39 is performed by the CPU 391, which executes a control program based on information indicating the charged electricity from the charge level measuring device 40.

More specifically, the charged electricity determiner 40c in FIG. 5 determines whether the level of the charged electricity of the charging unit 37 is equal to or greater than the threshold value #3, and transmits the determination result to the power switch 39. The power switch 39 determines whether the power is to be supplied from the charging unit 37 or the power supply unit 35 to each unit of the image forming apparatus 1 that is operating based on the determination result, and switches a power supply source from which the power is supplied.

Even in the power saving mode, charged electricity measuring operation is continued. When the charged electricity falls below the threshold value #3, the power switch 39 immediately switches, from the supply from the charging unit 37, to the supply from the power supply unit 35.

When the power generation efficiency of at least one of the power generation modules mounted on the power generator 36 is equal to or greater than a predetermined threshold, the power switch 39 may have a configuration (the same in the second and third examples described below), in which the power is not supplied from the charging unit 37 (charging battery 25) or the power supply unit 35 (power supply device 23), but supplied directly from the power generator 36 to the main controller 31 and the sensor.

Figure 8:
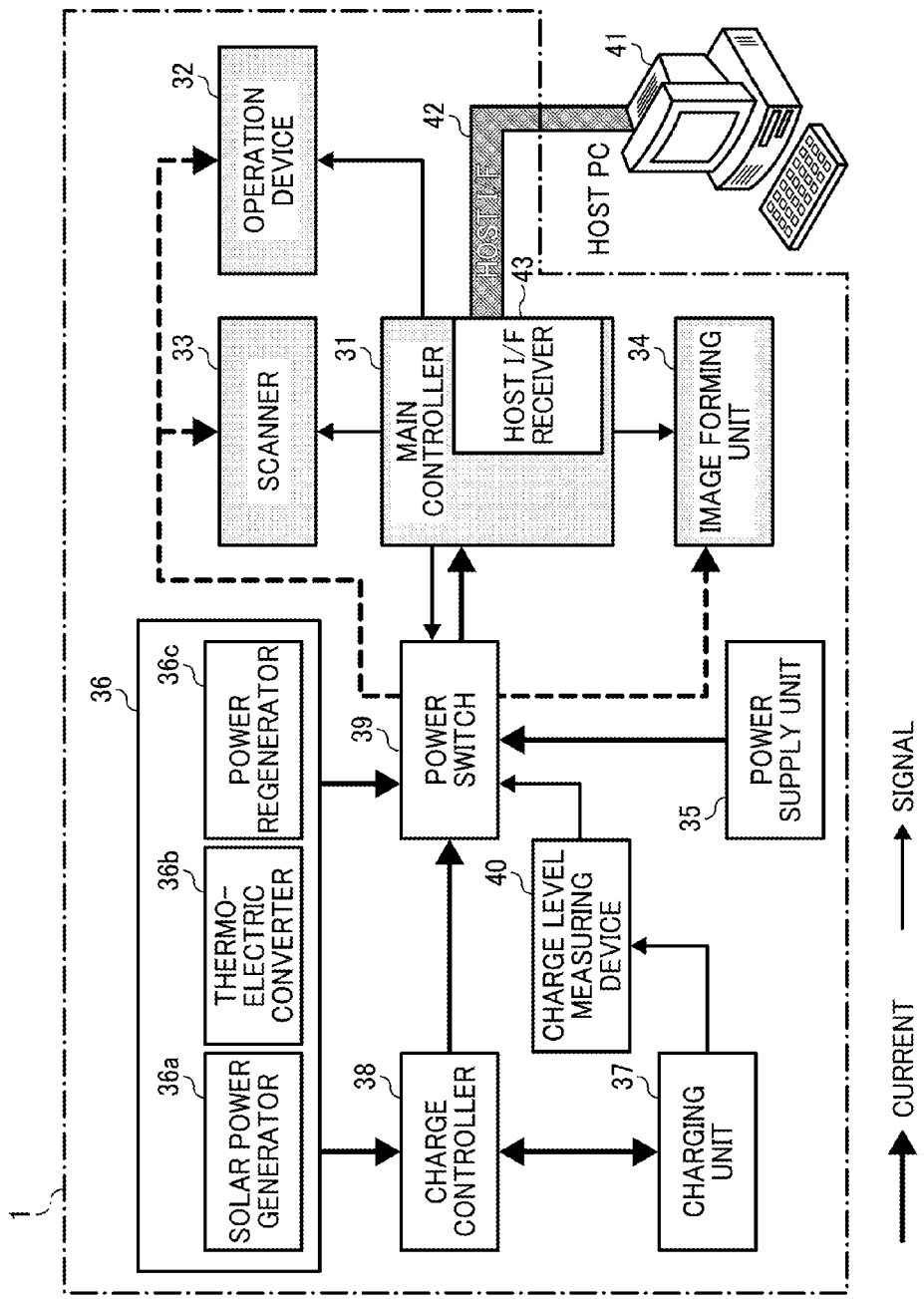
FIG. 8 is a diagram for explaining the power supply in the power saving mode according to an embodiment of the present invention.

FIG. 8 is a diagram for explaining the power supply of the second example in the power saving mode. FIG. 8 corresponds to FIG. 3, and the same reference numerals are given to the same functional blocks.

The second example differs from the first example in that the power is not supplied to a portion of the main controller 31 other than the host I/F receiver 43 of the main controller 31. Therefore, the power consumption of the second example is smaller than that of the first example. Accordingly, power supply can be sufficiently covered by the power charged in the charging unit 37, even when the charged electricity of the charging unit 37 is smaller.

In this state, the power switch 39 controls the charging unit 37 to supply power from the charging unit 37 to the host I/F receiver 43 and the sensor, when the charged electricity of the charging unit 37 is equal to or greater than a threshold value #2 (see FIG. 10). On the other hand, when the charged electricity of the charging unit 37 is less than the threshold value #2, the power switch 39 controls the power supply unit 35 to supply power from the power supply unit 35 to the host I/F receiver 43 and the sensor.

Figure 9:
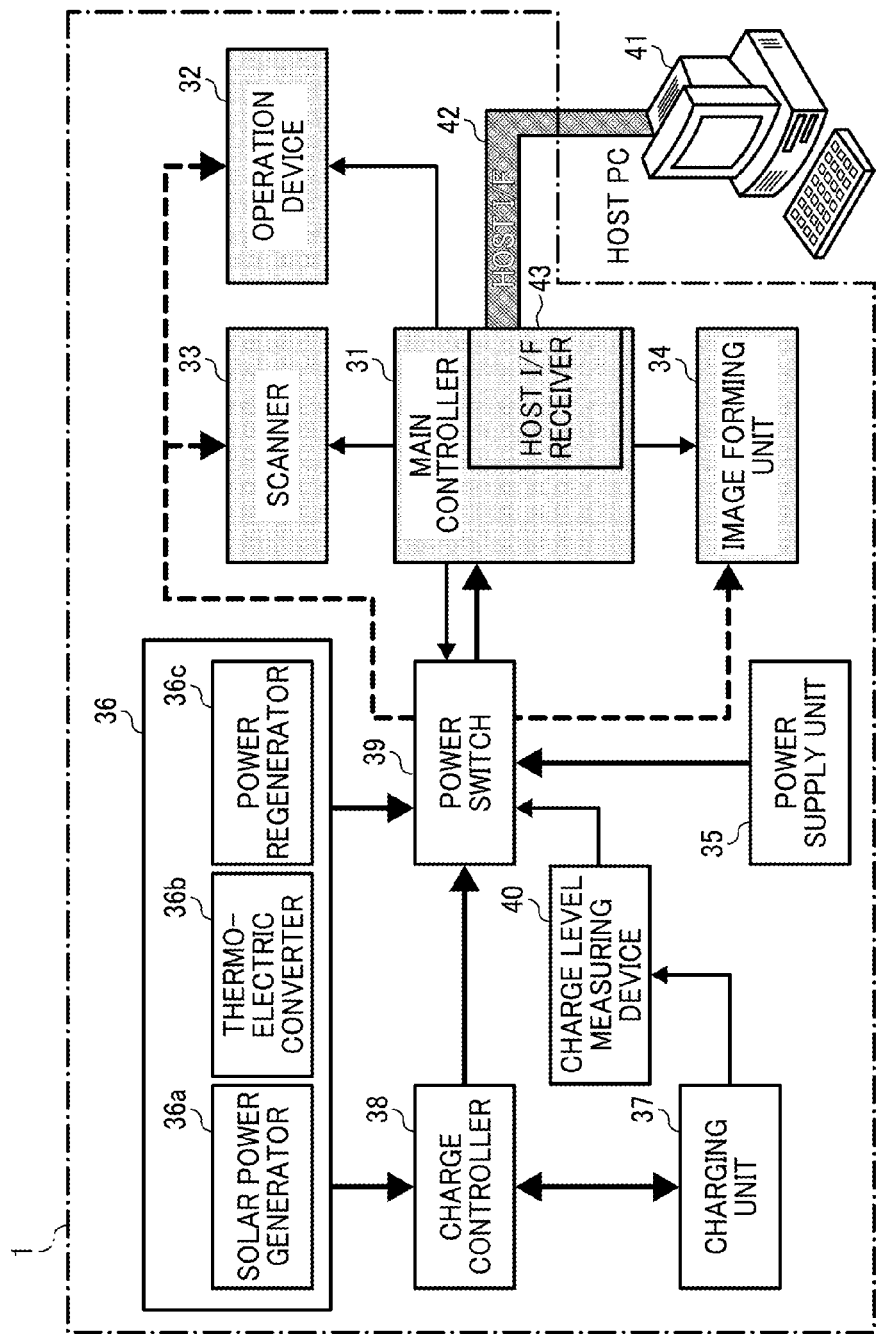
FIG. 9 is a diagram for explaining the power supply in the power saving mode according to an embodiment of the present invention.

FIG. 9 is a diagram for explaining the power supply of the third example in the power saving mode. FIG. 9 corresponds to FIG. 3, and the same reference numerals are given to the same functional blocks.

The third example differs from the second example in that the power is not supplied to the host I/F receiver 43. Therefore, the power consumption of the third example is even smaller than that of the second example, and it is assumed that the power supplied to each unit can be covered by the power charged in the charging unit 37, even when the charged electricity of the charging unit 37 is smaller.

In this state, the power switch 39 controls the charging unit 37 to supply power from the charging unit 37 to the sensor, when the charged electricity of the charging unit 37 is equal to or greater than a threshold value #1 (see FIG. 10). On the other hand, when the charged electricity of the charging unit 37 is less than the threshold value #1, the power switch 39 controls the power supply unit 35 to supply power from the power supply unit 35 to the sensor.

FIG. 10 illustrates a relation of the threshold values used for determining charged electricity performed by the charged electricity determiner 40c of the charge level measuring device 40.

As described above, three values (threshold values #1 to #3) are provided as the threshold value of the charged electricity being criteria of determination. Provided that, threshold value #1<threshold value #2<threshold value #3. These threshold values may be stored in any desired memory such as in the ROM.

In the first example of the power saving mode, in which the entire main controller 31 is operated, the power is supplied from the charging unit 37, when the charged electricity is equal to or greater than the threshold value #3. In the second example of the power saving mode, in which only the host I/F receiver 43 of the main controller 31 is operated, the power is supplied from the charging unit 37, when the charged electricity is equal to or greater than the threshold value #2. In the third example of the power saving mode, in which the main controller 31 is not operated, the power is supplied from the charging unit 37, when the charged electricity is equal to or greater than the threshold value #1.

As described above, in the image forming apparatus 1 of this first embodiment, the power switch 39 selects one of the power generator 36, the charging unit 37, and the power supply unit 35 based on the operating state of the image forming apparatus, as a power supply source to supply power to a unit of the main controller 31 that is operating. The operating state (condition) to be considered includes, whether it is in the power saving mode or not, the type of the power saving mode, and the power generation efficiency of the power generator 36. By switching a power supply source based on the operating state, the image forming apparatus 1 is operated without using the commercial power source and charged power as much as possible. With this configuration, the charged power can be saved for a longer time, thus suppressing power consumption from the outside.

When the image forming apparatus 1 operates in the power saving mode, the power consumption in the power saving mode can sufficiently be covered by the supply from the charging unit 37, such that the power consumption from the commercial power source in the power saving mode can be zero.

Moreover, as a power supply source is switched based on the electricity charged in the charging unit 37, operation failure in the image forming apparatus 1 may be prevented from occurring due to power shortage, while at the same time utilizing the power generated by the power generator 36 if available. The switching is controlled according to whether the electricity charged in the charging unit 37 is equal to or greater than a threshold value (first threshold value). The threshold value may be set differently according to a part (unit) of the image forming apparatus 1 to be operated as illustrated in FIG. 6. This is because, the smaller the power consumption of the unit to be operated, the unit can be operated by the power supply from the charging unit 37 with less electricity charged in the charging unit 37.

Figure 12:
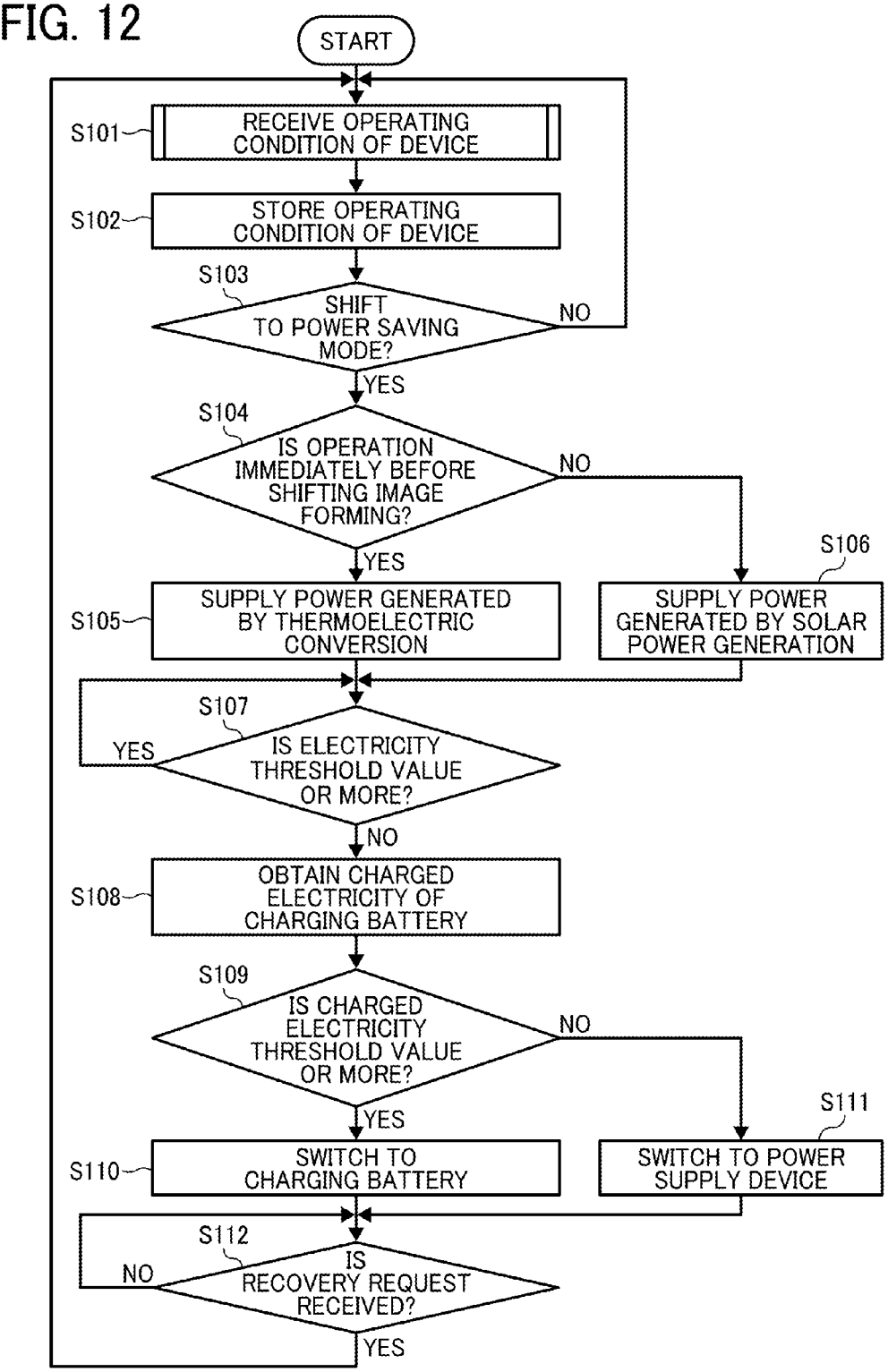
FIG. 12 is a flowchart illustrating operation of controlling power supply in shifting to the power saving mode of the second embodiment.

[Second Embodiment: FIGS. 11 and 12]

Next, the image forming apparatus being a second embodiment of the electronic device of the present invention will be described referring to FIGS. 11 and 12.

In the first embodiment, power supply from the charging unit 37 or the power supply unit 35 is switched based on charged electricity measured by the charge level measuring device 40. The second embodiment differs from the first embodiment in that operation of the image forming apparatus 1 is monitored and a power supply source, immediately after shifting to the power saving mode, is selected. That is, operation, performed immediately before the image forming apparatus 1 is shifted to the power saving mode, is monitored, and the power supply source which supplies power in the power saving mode is selected according to the operating state thereof.

For example, when the operation, performed immediately before shifting to the power saving mode, is printing operation, the image forming unit 34 is still operating. Thus, it is possible to generate power by thermoelectric conversion, since heat of a heat generating portion such as the fixing device 18 (FIG. 1) or the like is not yet cooled down. Therefore, the power is supplied from the thermoelectric converter 36b until the heat of the heat generating portion is cooled down.

That is, in the present embodiment, it is possible to directly supply (without interposing the charge controller 38) the power generated by the power generator 36, in addition to the power supply from the charging unit 37 or the power supply unit 35. As a result, discharged power supply from the charging battery can be suppressed and delay the decrease in charged electricity.

Here, only portions relating to switching control of this power supply source will be described, and portions not specifically referred to is similar to those of the first embodiment. The portions, in which the same reference numerals as the first embodiment are used, are in common with or corresponding to the configuration of the first embodiment.

FIG. 11 is a functional block diagram, corresponding to FIG. 3, of the image forming apparatus being the second embodiment of the electronic device of the present invention. FIG. 11 differs from FIG. 3 in that the operation monitoring device 44 is added.

The operation monitoring device 44 mainly monitors operation of the image forming unit 34. That is, the operation monitoring device 44 monitors the operation of the image forming unit 34 in transition to the power saving mode, and notifies the power generator 36 and the power switch 39 of the operating state.

Upon receiving a notification from the operation monitoring device 44 that the image forming unit 34 is operating, the power generator 36 transmits thermoelectric conversion power of the thermoelectric converter 36b to the power switch 39. On the other hand, upon receiving a notification that the image forming unit 34 is not operating, the power generator 36 transmits the power generated by the solar power generator 36a to the power switch 39.

The operation of the power switch 39 will be described below.

Next, referring to FIG. 12, operation of controlling switching of a power supply source in transition to the power saving mode is explained according to the second embodiment. The operation of FIG. 12 is performed by the CPU 391 of the power switch 39 according to a control program.

The operation of FIG. 12 is performed when the CPU 391 of the power switch 39 detects a signal from the main controller 31, as a main power source (commercial power source) of the image forming apparatus 1 is turned on.

Referring to FIG. 12, at S101, the CPU 391 receives a signal, from the operation monitoring device 44, which indicates the operating state of the image forming unit 34. At S102, the CPU 391 stores the operating state at least temporarily in a memory such as the RAM 393.

At S103, the CPU 391 determines whether the image forming apparatus 1 is shifted to the power saving mode. When it is determined that the image forming apparatus 1 is shifted to the power saving mode ("YES" at S103), the operation proceeds to S104. Otherwise, the operation returns to S101.

At S104, the CPU 391 refers to the operation contents, temporarily stored in Step S102, immediately before shifting to the power saving mode. The CPU 391 further determines whether the operation contents indicates image forming operation. When the operation contents immediately before shifting is image forming operation, that is, when the image forming unit 34 is operating immediately before shifting ("YES" at S104), the operation proceeds to S105.

At S105, the CPU 391 supplies the power generated by the thermoelectric converter 36b from the electricity transmitter 401 to the image forming apparatus 1. In this case, a portion such as the fixing unit which becomes high in temperature when printing is in a high temperature state, and it is assumed that the high power generation efficiency can be obtained in the thermoelectric converter 36b. Here, "immediately before" includes not only a moment when shifting to the power saving mode, but also a range of time before shifting in which the fixing unit and the like is considered not to be cooled down.

On the other hand, when the operation contents immediately before shifting is not the image forming operation ("NO" at S104), that is, when scanning operation, communicating operation with the host PC or the like is performed, the temperature of the device is low, and it is assumed that the power generation efficiency by the thermoelectric converter 36b is low. At S106, the CPU 391 supplies power generated by the solar power generator 36a from the electricity transmitter 401 to the image forming apparatus 1.

Since an engine such as a motor and the like is not operating when the image forming apparatus 1 is shifted to the power saving mode, power regeneration is not performed.

In this example, a portion (unit), to which the power is supplied, of the image forming apparatus 1 differs according to the type of the power saving mode as described with reference to FIGS. 7 to 9.

However, for example, when the power supply from the power generator 36 is the supply from the thermoelectric converter 36b, temperature of the image forming unit 34 is eventually cooled down. As a result, the power supply from the power generator 36 cannot be maintained when the power generation efficiency decreases. Also in the solar power generation, when the brightness of the surrounding becomes darker, the power generation efficiency may decrease.

In view of the above, at S107, the CPU 391 of the power switch 39 determines whether the electricity is maintained at a predetermined level (second threshold value).

When the electricity is at the predetermined level or greater, the CPU 391 determines that the power generation efficiency is maintained ("YES" at S107), and continues the power supply from the power generator 36.

On the other hand, when the electricity falls below the predetermined value, the CPU 391 determines that the power generation efficiency is not maintained ("NO" at S107) and the operation proceeds to S108. At S108, the CPU 391 obtains current charged electricity of the charging battery 25 to determine whether to switch a power supply source for supplying power to each unit of the image forming apparatus 1 that is operating to the charging battery 25 (charging unit 37). The charged electricity is obtained from the charge level measuring device 40 through the charged electricity measuring I/F 396.

When the charged electricity of the charging battery 25 is a threshold value or more ("YES" at S109), the CPU 391 switches the power supply from the power generated by the power generator 36 to power discharged from the charging battery 25 (S110). Although it is assumed that the threshold value is made a value indicating full charge, the value may be smaller. As shown in FIG. 10, a different threshold value may be used according to a portion (unit) of the image forming apparatus to which the power is supplied.

At this time, the CPU 101 of the image forming apparatus 1 controls the charge controller 38, and transmits the power discharged from the charging battery 25 to the power switch 39.

On the other hand, when the charged electricity of the charging battery 25 is less than the threshold value ("NO" at S109), at S111, the CPU 391 switches to the power supply from the power supply device 23 (power supply unit 35).

The CPU 391 maintains this power supply state until the CPU 391 receives a recovery request to the normal mode from the main controller 31 ("NO" at S112), and upon receiving the recovery request ("YES" at S112), the operation returns to S101.

As described above, in the image forming apparatus 1 in this second embodiment, the operation monitoring device 44 monitors whether the operation performed immediately before shifting to the power saving mode is image forming by the image forming unit 34. When the operation performed immediately before shifting is image forming (printing), the power switch 39 controls to supply the power generated by the thermoelectric converter 36b to the image forming apparatus 1.

As a result, the generated power using the heat generated by the image forming unit 34 can be supplied to the image forming apparatus 1. With this configuration, the charged power of the charging unit 37 can last for a long time while suppressing power consumption using the outside source.

Further, when the image forming apparatus 1 is in operation in the power saving mode and the electricity measured by the electricity measuring device 361b is less than the predetermined second threshold value, the power switch 39 performs switching so that the power is supplied from the charging unit 37 to the image forming apparatus 1. When the charged electricity measured by the charge level measuring device 40 is less than the predetermined first threshold value, the power switch 39 performs switching so that the power is supplied from the power supply unit 35 to the image forming apparatus 1. With this configuration, operation failure in the image forming apparatus 1 can be prevented from occurring due to power shortage.

[Third Embodiment: FIGS. 13 and 14]

Next, the image forming apparatus being a third embodiment of the electronic device of the present invention will be described.

In the first embodiment, power supply from the charging unit 37 or the power supply unit 35 is switched based on the charged electricity measured by the charge level measuring device 40. The third embodiment differs from the first embodiment in that the surrounding environment of the image forming apparatus 1 is monitored as the operating state of the image forming apparatus 1, and the power supply source, immediately after shifting to the power saving mode, is selected based on the surrounding environment.

The third embodiment differs from the second embodiment (FIG. 11) in that the third embodiment selects the power supply source based on the surrounding environment, while the second embodiment selects the power supply source based on the operating state of the image forming unit 34.

In the third embodiment, when the surrounding of the image forming apparatus 1 is bright (sunlight irradiation in daytime, irradiation by lighting lamp, and the like), it is possible to generate power by the solar power generator 36a. Therefore, the power is supplied from the solar power generator 36a as long as the surrounding is bright.

That is in the third embodiment, in addition to power supply from the charging unit 37 or the power supply unit 35, it is possible to directly supply (without interposing the charge controller 38) power generated by the power generator 36, which is similar to the second embodiment. As a result, discharged power supply from the charging battery can be suppressed and delay the decrease in charged electricity.

Here, only portions relating to switching control of this power supply source will be described, and portions not specifically referred to is similar to those of the first embodiment. The portions, in which the same reference numerals as the first embodiment are used, are in common with or corresponding to the configuration of the first embodiment.

FIG. 13 is a functional block diagram, corresponding to FIG. 3, of the image forming apparatus being the third embodiment of the electronic device of the present invention. FIG. 13 differs from FIG. 3 in that environment monitoring device 45 is added.

The environment monitoring device 45 in the figure includes the illuminance sensor (embodiment of the light quantity measuring unit) for measuring surrounding illuminance (light quantity) of the image forming apparatus 1, monitors the surrounding illuminance of the image forming apparatus 1 in shifting to the power saving mode, and informs the power generator 36 and the power switch 39 of the data.

The power generator 36 receives a notice of the data of the surrounding illuminance from the environment monitoring device 45, and transmits the power generated by the solar power generator 36a to the power switch 39, when the illuminance is a predetermined threshold value or more.

Next, referring to FIG. 14, operation of controlling switching of a power supply source in transition to the power saving mode in the third embodiment is described according to the third embodiment. The operation of FIG. 14 is performed by the CPU 391 of the power switch 39 according to a control program.

The operation of FIG. 14 is performed when the CPU 391 of the power switch 39 detects a signal from the main controller 31, as a main power source (commercial power source) of the image forming apparatus 1 is turned on.

Referring to FIG. 14, at S201, the CPU 391 receives the surrounding illuminance data from the environment monitoring device 45, and temporarily stores the data in a desirable memory such as the RAM 393. In this case, the data of the power generation efficiency of the solar power generator 36a, not the surrounding illuminance data, may be received. It is an effective method in a case where correspondence relation between the illuminance and the power generation efficiency is not preliminary known.

At S202, the CPU 391 determines whether the image forming apparatus 1 is shifted to the power saving mode. When the CPU 391 detects a signal, from the main controller 31, indicating that the image forming apparatus 1 is shifted to the power saving mode ("YES" at S202), the CPU 391 refers to the illuminance data, temporarily stored in Step S201, immediately before shifting to the power saving mode. Otherwise, the operation returns to S201.

When the surrounding illuminance immediately before shifting is a predetermined threshold value or more ("YES" at S203), the CPU 391 switches, so that the power generated by solar power generation is supplied from the electricity transmitter 401 to the image forming apparatus 1 (S204).

On the other hand, when the surrounding illuminace immediately before shifting is less than the threshold value (that is, the surrounding is dark) ("NO" at S203), it is assumed that the power generation efficiency of the solar power generation is low. At S205, the CPU 391 obtains the power generation efficiency of the thermoelectric converter 36b from the power generator 36.

When the power generation efficiency of the thermoelectric converter 36b is less than a predetermined value ("YES" at S206), the CPU 391 switches so that the power is supplied to each unit of the image forming apparatus 1 from the power supply device 23 (S212).

On the other hand, when the power generation efficiency of the thermoelectric converter 36b is more than a predetermined value ("NO" at S206), the CPU 391 switches so that the power is supplied to each unit of the image forming apparatus 1 from the thermoelectric converter 36b (S207).

In this example, a portion (unit), to which the power is supplied, of the image forming apparatus 1 differs according to the type of the power saving mode as described with reference to FIGS. 7 to 9.

However, for example, when the power supply from the power generator 36 is the supply from the thermoelectric converter 36b, temperature of the image forming unit 34 is eventually cooled down. As a result, the power supply from the power generator 36 cannot be maintained when the power generation efficiency decreases. Also in the solar power generator 36a, when the brightness of the surrounding becomes darker, the power generation efficiency decreases.

In view of the above, at S208, the CPU 391 of the power switch 39 determines whether the power generation efficiency is maintained at the predetermined level (second threshold value).

When the power generation efficiency is the threshold value or more, the CPU 391 determines that the power generation efficiency is maintained ("YES" at S208), and continues the power supply from the power generator 36.

On the other hand, when the power generation efficiency falls below the predetermined value, the CPU 391 determines that the power generation efficiency is not maintained ("NO" at S208) and the operation proceeds to S209. At S209, the CPU 391 obtains current charged electricity of the charging battery 25 to determine whether to switch a power supply source for supplying to each unit of the image forming apparatus 1 to the charging battery 25 (charging unit 37). Although it is assumed that the threshold value is made a value indicating full charge, the value may be smaller. As shown in FIG. 10, a different threshold value may be used according to a unit to which the power is supplied. The charged electricity is obtained from the charge level measuring device 40 through the charged electricity measuring I/F 396.

When the charged electricity of the charging battery 25 is the threshold value or more ("YES" at S210), the CPU 391 switches the power supply from the power generated by the power generator 36 to the power discharged from the charging battery 25 (S211). Although it is assumed that the threshold value is made a value indicating full charge, the value may be smaller. As shown in FIG. 10, a different threshold value may be used according to a unit to which the power is supplied.

At this time, the CPU 101 of the image forming apparatus 1 controls the charge controller 38, and transmits the power discharged from the charging battery 25 to the power switch 39.

On the other hand, when the charged electricity of the charging battery 25 is less than the threshold value ("NO" at S210), at S212, the CPU 391 switches to the power supply from the power supply device 23 (power supply unit 35).

The CPU 391 maintains this power supply state until the recovery request to the normal mode is received from the main controller 31 ("NO" at S213), and upon receiving the recovery request ("YES" at S213), the operation returns to S201.

As described above, in the image forming apparatus 1 of this third embodiment, the power switch 39 controls so that the power generated by the solar power generator 36a is supplied to the image forming apparatus 1, when the illuminance is the predetermined threshold value or more, based on the illuminance data from the environment monitoring device 45 which includes the illuminance sensor for measuring surrounding light quantity (illuminance) being the operating state of the image forming apparatus 1.

As a result, the power generated by the solar power generator 36a can be supplied to the image forming apparatus 1. With this configuration, the charged power of the charging unit 37 can last for a long time while suppressing power consumption.

Further, when the image forming apparatus 1 is in operation in the power saving mode and the electricity measured by the electricity measuring device 361a is less than the predetermined second threshold value, the power switch 39 performs switching so that the power is supplied from the charging unit 37 to the image forming apparatus 1. When the charged electricity measured by the charge level measuring device 40 is less than the predetermined first threshold value, the power switch 39 performs switching so that the power is supplied from the power supply unit 35 to the image forming apparatus 1. With this configuration, operation failure in the image forming apparatus 1 can be prevented from occurring due to power shortage.

Although in the above embodiments, power source switching in a case where the image forming apparatus 1 is shifted from a normal operation mode to the power saving mode has been described, also in a case where shifted from the power saving mode to the normal operation mode, it is assumed that switching to a commercial power source (AC power source) is not always required, if normal operation after recovery does not consume much power.

For example, when the operation after recovery is printing operation, a relatively large amount of power is consumed, therefore, it is required to switch to the commercial power source. However, when the operation after recovery is scanning operation, a relatively small amount of power is consumed. Thus, it is possible to directly supply power from the charging battery or a power generation device. In addition, it is possible to supply power from the charging battery for the communication with the host PC and the like in the nighttime, since it requires only a small amount of power (the solar generation is difficult since it is dark in the nighttime).

Although the embodiments of the present invention have been described above as an example when the electronic device is the image forming apparatus, the present invention is not limited to the image forming apparatus and can be applied to the electronic device which includes the power generation unit, the charging unit, and the power supply unit for receiving power supply from the external power source. Examples include an automatic vending machine including a solar panel.

In the present invention, a specific configuration of each device, contents of processing, a configuration of data, the number of devices to be used or the like are not limited to the one described in the embodiments.

For example, criteria of switching of the power supply source is not limited to the one described in each embodiment. In addition, the system of the power generation in the power generator 36 is also not limited to a solar battery, thermoelectric conversion, and power regeneration, and the power generation of an arbitrary system can be used. In addition, it is not essential to provide plural types of power saving modes, such that the type of power saving mode may be one.

In addition, in the above embodiments an example has been described in which the output controller 362 selects a power generation module in a plurality of power generation modules for supplying power to each unit of the image forming apparatus. However, this is not essential, and a plurality of power generation modules may be selected at the same time. For example, two power generation modules may be selected in order from the highest power generation efficiency at the time of selecting, and the power generated by these power generation modules may be added, or the output controller 362 may be configured so that the power generated by three power generation modules is all added and supplied. Moreover, it is not essential to provide a plurality of power generation modules.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An electronic device, comprising:
    a power generation device configured to generate electricity, the power generation device including a plurality of power generation components, at least one of the plurality of power generation components being selected to generate electricity based on an operating state of the electronic device and surrounding environment of the electronic device;
    a charging battery configured to be charged by the power generation device;
    a power supply configured to receive power from an outside power source; and
    a processor configured to select at least one of the power generation device, the charging battery, and the power supply as a power supply source to supply electric power to each unit of the electronic device that is operating, based on the operating state of the electronic device or an operation being performed by the electronic device.

2. The electronic device of claim 1, further comprising:
    a first measuring device configured to measure an amount of charged electricity on the charging battery, wherein,
    the processor is configured to select at least one of the power generation device, the charging battery, and the power supply as the power supply source to supply electric power, based on the amount of charged electricity, the operating state of the electronic device or the operation being performed by the electronic device.

3. The electronic device of claim 2, wherein the operating state of the electronic device indicates whether the electronic device operates in a power saving mode, and if the electronic device is configured to operate in the power saving mode, the processor is configured to,
    select the charging battery as the power supply source to supply electric power to each unit of the electronic device that is operating in the power saving mode if the amount of charged electricity is equal to or greater than a first threshold value, and
    select the power supply to supply electric power to each unit of the electronic device that is operating in the power saving mode if the amount of charged electricity is less than the first threshold value.

4. The electronic device of claim 3, wherein
    if the electronic device operates in the power saving mode with the charging battery as the power supply source, the first measuring device is configured to continuously measure the amount of charged electricity on the charging battery, and
    if the amount of charged electricity is less than the first threshold value, the processor is configured to switch the power supply source from the charging battery to the power supply.

5. The electronic device of claim 3, wherein the processor is configured to set the first threshold value to a value previously determined based on the unit of the electronic device to which the electric power is supplied in the power saving mode.

6. The electronic device of claim 2, further comprising:
    a second measuring device configured to measure an amount of generated electricity at the power generation device, wherein,
    the processor is configured to select at least one of the power generation device, the charging battery, and the power supply as the power supply source to supply electric power, based on the amount of generated electricity, the operating state or the operation of the electronic device and the amount of charged electricity on the charging battery.

7. The electronic device of claim 6, wherein the operating state of the electronic device indicates whether the electronic device operates in a power saving mode, and if the electronic device is configured to operate in the power saving mode, the processor is configured to,
    select the power generation device as the power supply source to supply electric power to each unit of the electronic device that is operating in the power saving mode if the amount of generated electricity is equal to or greater than a second threshold value, and
    select the charging battery as the power supply source to supply electric power to each unit of the electronic device that is operating in the power saving mode if the amount of generated electricity is less than the second threshold value.

8. The electronic device of claim 7, wherein
    if the electronic device operates in the power saving mode with the power generation device as the power supply source, the second measuring device is configured to continuously measure the amount of generated electricity of the power generation device, and
    if the measured generated electricity is less than the second threshold value, the processor is configured to switch the power supply source from the power generation device to the charging battery.

9. The electronic device of claim 7, wherein the power generation device includes:
    a solar battery as one of the plurality of the power generation components, and
    a measuring device configured to measure surrounding luminance of the electronic device, wherein,
    if the electronic device operates in the power saving mode and the measured luminance is equal to or greater than the second threshold value, the processor is configured to select the solar battery as the power supply source to supply electric power to each unit of the electronic device that is operating in the power saving mode.

10. The electronic device of claim 1, wherein
    if the electronic device is preforming image forming using an image forming unit, the processor is configured to select the power supply as the power supply source to supply electric power, and
    if the electronic device is performing one of scanning and communicating through a network, the processor is configured to select the charging battery as the power supply source to supply electric power.

11. The electronic device of claim 1, further comprising:
    a scanner configured to scan an original document into a scanned image; and
    an image forming unit configured to form the scanned image on a recording sheet, wherein,
    the power generation device includes a thermoelectric converter as one of the power generation components near a fixing unit of the image forming unit, and
    the processor is configured to,
        determine, based on a transition to a power saving mode, if an operation performed by the electronic device immediately before the transition is the image forming performed by the image forming unit, and select the thermoelectric converter of the power generation device as the power supply source to supply electric power if it is determined that the image forming is performed.

12. The electronic device of claim 1, wherein
the operating state includes a normal operating mode and a plurality of power saving modes, and
the surrounding environment includes surrounding illuminance data of the electronic device or the power generation efficiency of a solar power generator.

13. A method of controlling power supply, comprising:
controlling a switching of a power supply source configured to supply electric power to each unit of an electronic device based on an operating state of the electronic device or an operation being performed by the electronic device, wherein,
the power supply source is selected from one of a power generation device configured to generate electricity, a charging battery configured to charge electricity, and a power supply configured to receive power from an outside power source, and
the power generation device includes a plurality of power generation components, at least one of the plurality of power generation components being selected to generate electricity based on an operating state of the electronic device and surrounding environment of the electronic device.

14. The power supply method of claim 13, further comprising:
measuring an amount of charged electricity on the charging battery; and
selecting at least one of the power generation device, the charging battery, and the power supply as the power supply source to supply electric power based on the amount of charged electricity, the operating state of the electronic device or the operation being performed by the electronic device.

15. The power supply method of claim 14, further comprising:
measuring an amount of generated electricity at the power generation device; and
selecting at least one of the power generation device, the charging battery, and the power supply as the power supply source to supply electric power based on the amount of generated electricity, the operating state or the operation of the electronic device and the amount of charged electricity on the charging battery.

16. The power supply method of claim 15, wherein, based on a transition to a power saving mode, the method further comprises:
selecting the power generation device as the power supply source to supply electric power to each unit of the electronic device that is operating in the power saving mode if the amount of generated electricity is equal to or greater than a second threshold value;
selecting the charging battery as the power supply source to supply electric power to each unit of the electronic device that is operating in the power saving mode if the amount of charged electricity is less than the second threshold value and is equal to or greater than a first threshold value; and
selecting the power supply as the power supply source to supply electric power to each unit of the electronic device that is operating in the power saving mode if the amount of charged electricity is less than the first threshold value.

17. A non-transitory recording medium storing computer readable instructions which, when executed by a processor, cause the processor to perform:
controlling a switching of a power supply source configured to supply electric power to each unit of an electronic device based on an operating state of the electronic device or an operation being performed by the electronic device, wherein,
the power supply source is selected from one of a power generation device configured to generate electricity, a charging battery configured to charge electricity, and a power supply configured to receive power from an outside power source, and
the power generation device includes a plurality of power generation components, at least one of the plurality of power generation components being selected to generate electricity based on an operating state of the electronic device and surrounding environment of the electronic device.

18. The electronic device of claim 1, wherein the plurality of power generation components include a solar power generator, a thermoelectric converter, and a power generator.

* * * * *